INVENTOR.
RUDOLPH M. VAUGHN
BY *Elliott & Pastoriza*
ATTORNEYS

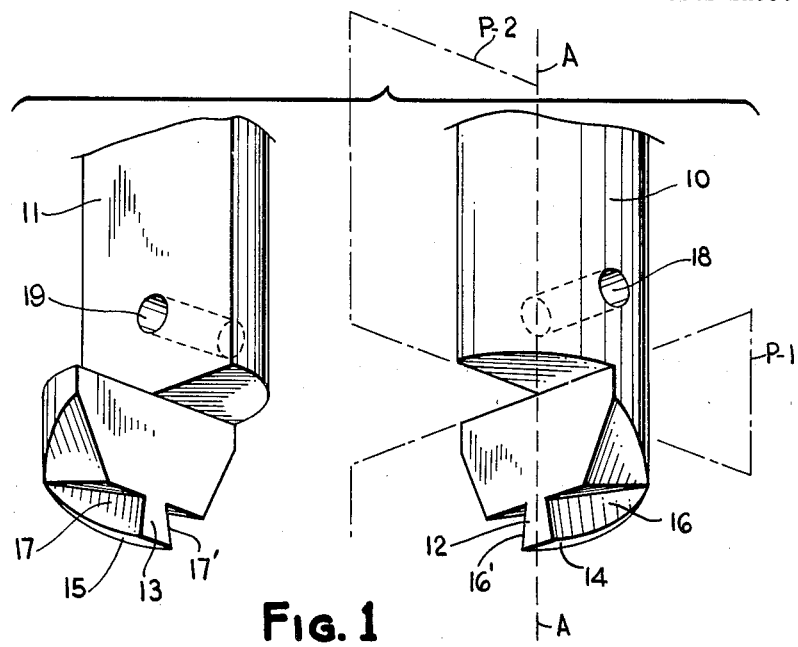
FIG. 1
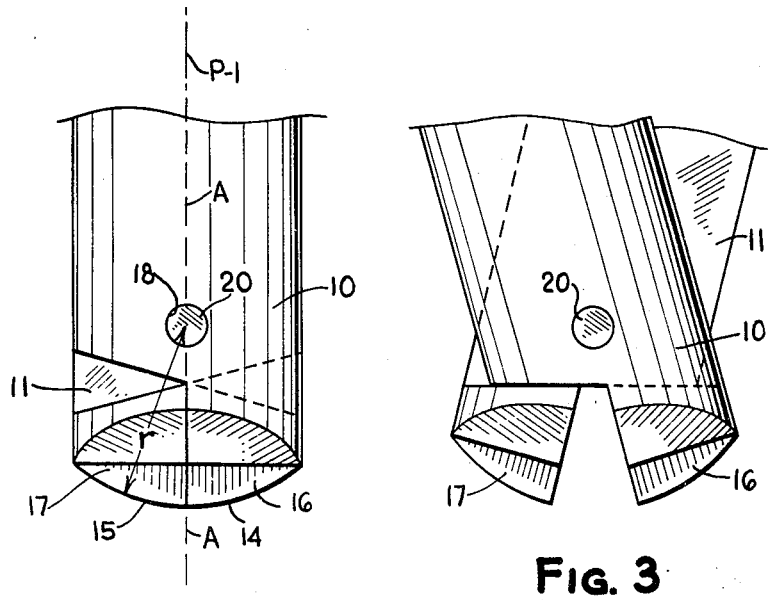
FIG. 2
FIG. 3
INVENTOR.
RUDOLPH M. VAUGHN
BY Elliott & Pastoriza
ATTORNEYS Aug. 23, 1960   R. M. VAUGHN   2,949,949
SPLIT DRIVER AND REMOVING TOOL
Filed Jan. 23, 1959   3 Sheets-Sheet 2

Aug. 23, 1960  R. M. VAUGHN  2,949,949
SPLIT DRIVER AND REMOVING TOOL
Filed Jan. 23, 1959  3 Sheets-Sheet 3

INVENTOR.
RUDOLPH M. VAUGHN
BY Elliott & Pastoriza
ATTORNEYS

United States Patent Office 2,949,949
Patented Aug. 23, 1960

2,949,949

SPLIT DRIVER AND REMOVING TOOL

Rudolph M. Vaughn, 2008 N. Westwood,
Santa Ana, Calif.

Filed Jan. 23, 1959, Ser. No. 788,656

4 Claims. (Cl. 145—50)

This invention relates generally to screw drivers and more particularly to a novel split driver construction for both driving and removing screws having undercut screw head slots.

The preferred embodiment of the present invention is most useful in connection with slotted screw heads provided with undercut non-planar surfaces of revolution such as fully set forth in my United States Patent Number 2,677,985. The principles of the invention, however, are also applicable to any type of slotted screw head or slotted bolt in which the surfaces are undercut and in which the width of the slot diverges with increasing radial distances from the center of the screw head.

Heretofore, the removal of screws is generally accomplished by simply rotating the screw in a counter clockwise direction by a conventional screw driver. In the event the screw is extremely tight or employed as part of a blind fastener such as the type shown and described in my U.S. Patent Number 2,863,351, a very high torque is required to unthread the screw. This high torque can result in the screw driver camming out of the slot notwithstanding the slot includes undercut surfaces. In the case of a blind fastener, simple turning of the screw in a counter clockwise direction will oftentimes simply rotate the expanded nut on the opposite side of the screw rather than accomplishing an unthreading of the screw from the nut.

Both of the foregoing difficulties can be overcome if it is possible to exert a backward force on the screw as it is being rotated in a counter-clockwise direction. This backward force will augment the axial rearward force exerted by the screw threads when they are rotated in a counter-clockwise direction and thus decrease essentially the encountered friction of the screw threads. In the case of a blind fastener, the backward force will tend to hold the expanded nut against the rear wall through which the fastening passes and thus enable the screw to be unthreaded from the nut without rotating the nut.

It is a primary object of this invention, accordingly, to provide a novel screw driver for use with an undercut screw head slot in which a rearward or outward axial force may be exerted on the screw simultaneously with counter-clockwise rotation thereof to facilitate removal of the screw.

Another object is to provide a screw driver adapted to be temporarily secured within an undercut screw slot so that a screw may be held by the driver for insertion in inaccessible places.

A particular object of the invention is to provide a novel removing tool for screws or bolts employed as parts of blind fastening devices such as the blind fastener described in my said U.S. Patent Number 2,863,351.

Still another object is to provide a driver meeting the foregoing objects in the form of two identical half parts whereby considerably economy is realizable in the manufacture thereof.

Briefly, these and many other objects and advantages of the present invention are attained by providing a split driver removing tool having first and second half body portions terminating in half driving ends. These body portions are pivoted together for scissoring movement. The half driving ends are divided by a plane generally normal to the central opposite sides of the driving ends and these sides diverge from each other on opposite sides of this dividing plane. The side walls of the driving ends also converge in an upward direction. The screw head slot is undercut and its side walls diverge with increasing radial distance from the center of the screw head.

By the foregoing construction, the narrower central portion of the half driving ends may be inserted in the wider outer portions of the slot and the half driving ends then scissored together to grip the side walls of the slot as a consequence of the undercut construction. The screw is thus secured to the end of the driver and by employing a simple sleeve on the driver movable over the half body portions, the driving ends are held together within the slot. Thus, an outward pull on the screw may be effected as it is rotated in a counter-clockwise direction to remove the screw. Moreover, inasmuch as the screw is secured to the driving end of the screw driver, it may be initially threaded into openings or nuts in inaccessible places wherein it is normally difficult for an operator to both hold and initiate threading of the screw at the same time.

A better understanding of the invention will be had by referring to the preferred embodiment thereof as illustrated in the accompanying drawings in which:

Figure 1 is an enlarged exploded perspective view illustrating portions of the two halves of the split driver and removing tool of this invention;

Figure 2 is a side elevational view of the assembled driver with the half driving ends in closed position;

Figure 3 is a view similar to Figure 2 illustrating the half driving ends in open or separated position;

Figure 4:
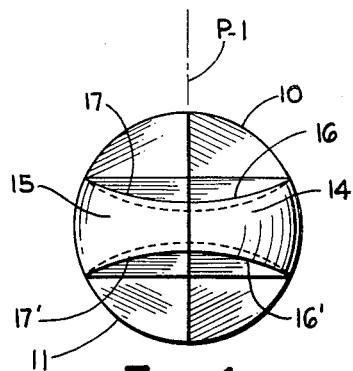
Figure 4 is a bottom view of the driver in the position illustrated in Figure 2.

Referring first to Figure 1, the screw driver comprises two half body portions 10 and 11 terminating in half driving ends 12 and 13. Each of the half driving ends includes an arcuate bottom 14 and 15 and opposite side walls as indicated at 16, 16', and 17, 17'. Suitable horizontal bores 18 and 19 pass through the bodies as shown. The two half portions of the driver are identical in construction. By rotating the body half 11 through 90° about a vertical axis, the half portions and half driving ends may be fitted together so that the horizontal bores 18 and 19 register.

Referring to Figure 2, the half body and driving end portions of Figure 1 are shown assembled together with a single pivot pin 20 passing through the bores 18 and 19 to pivot the two halves for limited scissoring movement. This referred to scissoring movement will be evident by referring to Figure 3 wherein the two halves are shown as scissored apart.

It will be noted in the position of Figure 2, that when the two halves are in closed relationship, the bottoms 14 and 15 form a continuous arc having a radius of curvature r which terminates on the longitudinal axis A—A of the screw driver. This point of termination coincides with the point of intersection of the horizontal pivot axis with the longitudinal axis A—A.

The preferred division of the split driver is as shown in Figures 1, 2 and 3 wherein the driving end portions 12 and 13 are divided by a vertical plane P–1 passing through the longitudinal axis A—A in a generally normal direction to the central sides of the driving end. In the view of Figure 2, this plane is perpendicular to the plane of the drawing. The upper body portions 10 and 11, on the other hand, are divided by a second vertical plane P–2 which in the view of Figures 2 and 3 is parallel with the plane of the drawing and is normal to the first plane P–1. This second plane also includes the longitudinal axis A—A.

It will be noted in Figure 1 that the opposite side walls 16, 16', and 17, 17' converge towards each other in an upward direction as viewed in the vertical plane P–1.

Figure 5:
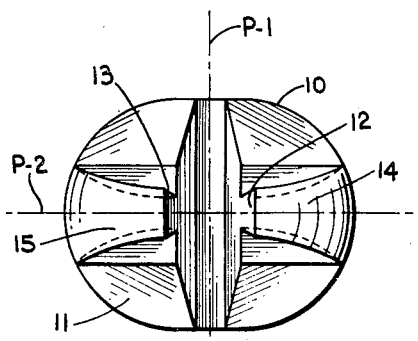
Figure 5 is another bottom view of the driver in the position illustrated in Figure 3.

In Figures 4 and 5, it will be seen that the driver side walls 16, 16' and 17, 17' also diverge away from each other on opposite sides of the vertical dividing plane P–1. As a consequence, the driving end of the driver is narrower at its central region than at its outer termination points.

Figure 6:
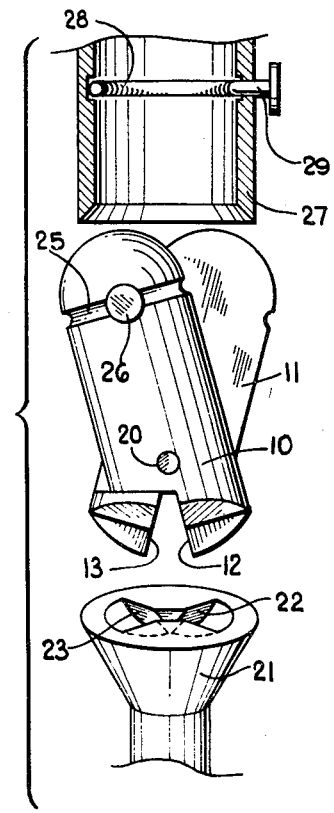
Figure 6 is an elevational view partly in perspective illustrating the screw driver in position for being received in a special type of slotted screw head.
Figure 7:
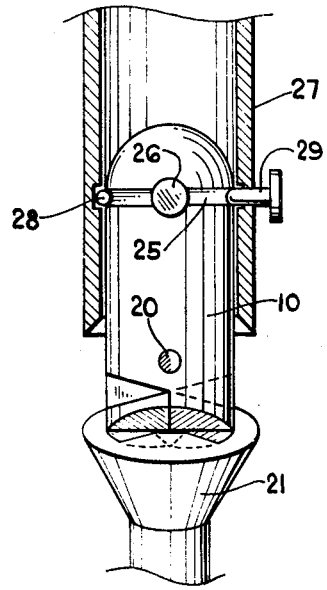
Figure 7 is a view similar to Figure 6 showing the screw driver secured within the slot of the screw head of Figure 6.

Referring now to Figures 6 and 7, the manner in which the driver of this invention co-operates with a slotted screw head will be described. Referring first to Figure 6, there is shown a screw head 21 provided with an undercut slot having non-planar side surfaces of revolution 22 and 23. The width of this slot increases as the radial distance increases from the center of the slot outwardly as shown. Therefore the central portion 24 of the slot is narrower than the outer portions.

In employing the improved screw driver, the half driving ends 12 and 13 are separated by scissoring movement about the pivot pin 20 as shown in Figure 6. The driver may then be lowered into the slot and since the narrowest width portions of the driving ends are separated, they will be received in the wider portions of the slot respectively. After the driver has been inserted in the slot, the halves are pivoted together to the position illustrated in Figure 7 to bring the driving ends together so that the undercut walls 22 and 23 are tightly engaged by the converging walls 16, 16' and 17, 17' of the driving ends. Since the major portion of the floor of the slot is wider than the top peripheral edges of the slot as a consequence of the undercut feature of the walls, it will be evident that the driving end of the split driver in its closed position of Figure 7 will be locked within the slot and the screw thus secured to the end of the driver.

To retain the two half body portions 10 and 11 in the position in which the half driving ends are closed together, there may be provided an annular groove 25 about each half body portion 10 and 11 and a single central detent or cavity 26 co-operating with an outer sleeve 27 arranged to be telescoped over the half sections when they are closed. Thus, as shown in Figure 7, the inner walls of the sleeve include a snap ring 28 which will snap into the groove 25 and a simple plunger 29 arranged to be received within the cavity 26 by rotating the sleeve 27 until the plunger 29 is juxtaposed the detent to be received therein. Thus, the sleeve is locked to the driver ends and rotation of the sleeve will rotate the driver. Moreover, the driver halves will be held together by the surrounding sleeve.

Figure 8:
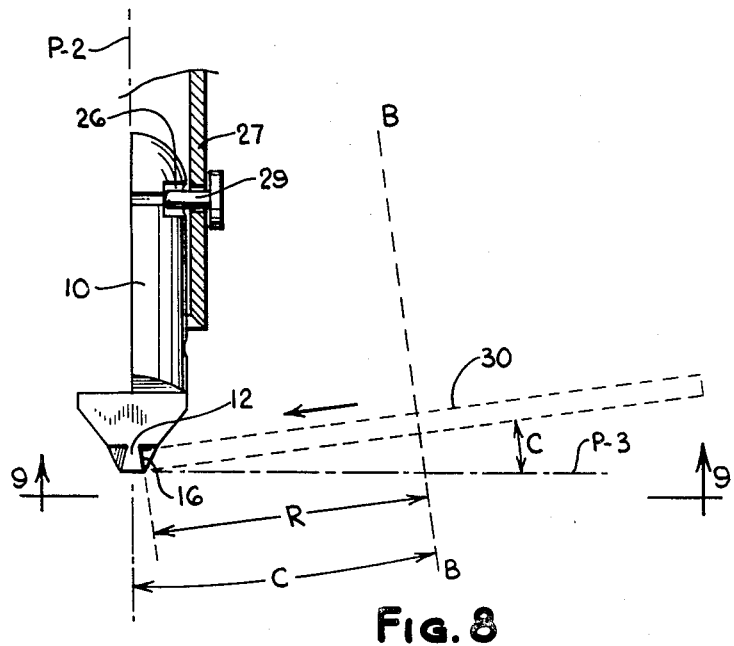
Figure 8 is a partial schematic illustration of a machining operation for forming the side walls of the screw driver; and, Figure 9 is a bottom plan view of the machining operation illustrated in Figure 8.

The sleeve 27 and plunger 29 positioned within the detent 26 are illustrated in the upper portion of the driver illustrated in Figure 8.

With the screw driver locked onto the slotted screw head 21 as illustrated in Figure 7, the screw may be carried by the driver itself. By making the sleeve long or by providing an extension handle, the threading of the screw thereof may be effected in normally inaccessible places.

The principal feature of the present invention, however, resides in the construction which enables a backward pull to be effected on a screw head while removing the same. Thus, when the driver is engaged with the screw head 21 as shown in Figure 7, simple upward pulling on the driver will tend to pull the screw 21 away from its thread. This pulling force coupled with counterclockwise rotation of the screw head will greatly facilitate the removal of the screw. Accordingly, the design of the screw driver of this invention will enable a backward force to be applied to a slotted screw head while removing the same.

In order to manufacture the described side surfaces 16, 16' and 17, 17' on the driver halves, each half driving end is preferably formed separately.

Referring to Figure 8, for example, there is illustrated one method of forming the desired side surfaces of the driving ends. As shown, there is provided a large diameter cutting wheel 30 having a radius R and its axis B—B forming an acute angle with the longitudinal axis A—A of the driver when projected on the first vertical plane P–1 which corresponds to the plane of the drawing in Figure 8. As a consequence of this inclination of the axis B—B of the driving wheel 30, the plane of the driving wheel 30 itself will form an equal angle C with a third horizontal plane P–3 normal to the plane of the drawing of Figure 8. The radius R is from four to eight times the radius of curvature r of the arcuate bottom. The angle C is preferably ten degrees but may range from eight to twelve degrees.

By cutting into the side surface of the driving end 12 as illustrated in Figure 8 on each side of the driving end relative to the vertical plane P–2, the desired converging of these opposite sides in an upward direction as viewed in the plane P–2 will be achieved.

Figure 9:
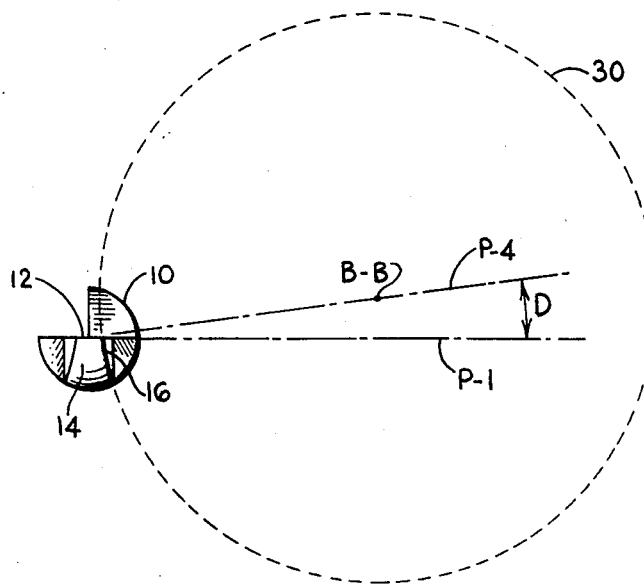

Referring now to Figure 9, it will be noted that the axis B—B of the cutting wheel is displaced from the plane P–1 by an angle D. Thus, the plane P–4 which includes both the axis of the cutting wheel B—B and the longitudinal axis A—A of the driver in Figure 9 will form the angle D with the first vertical plane P–1. This angle is preferably seven and one-half degrees but may range from five to ten degrees. As a consequence, the cutting of the side 16 of the driving end 12 will result in opposite side walls which will diverge in a direction away from the plane P–1 as described heretofore in connection with Figures 4 and 5.

The other half driving end 13 is formed in an identical manner so that when the same is mated with the driving end 12 as also described heretofore, the desired configuration results.

Because a circular cutting wheel 30 is employed, the side surfaces of each driving end are cylindrical surfaces, the axes of the cylindrical surfaces coinciding with the original axis B—B of the cutting wheel and forming the same angles described above with the various reference planes. On the other hand, the undercut non-planar side surfaces of the slot of the screw head with which the present invention is employed are actually conically shaped as fully set forth in said U.S. Patent Number 2,677,985. Accordingly, when the driving end halves are closed within the slotted screw head in Figure 7 there will not be complete surface to surface engagement since the cylindrical side surfaces of the driving end will be different in shape from the conical surface portions of the sides 22 and 23 of the undercut slot. This is a desired feature, however, since any yielding of the side wall slots will take place from a center position radially outwardly when a very high torque is required to unthread the screw. The various advantages of this type of side wall configuration for the driving end is fully set forth in my co-pending U.S. patent application, Serial No. 785,969, filed January 9, 1959 for "Improved Screw Driver and Method of Making Same."

From the foregoing description, it will be evident that the present invention has provided a novel tool serving both as a screw driving tool and as a removing tool wherein the feature of enabling a backward force to be applied to a screw head simultaneously with a counter-clockwise rotation is achieved.

Minor modifications that fall within the scope and spirit of this invention will readily occur to those skilled in the art. The split driver and removing tool is, therefore, not to be thought of as limited to the specific embodiment set forth for illustrative purposes.

What is claimed is:

1. A split driver removing tool comprising: a driving end having an arcuate bottom of given radius of curvature terminating on the longitudinal axis of said tool, said driving end being divided into two symmetrical halves by a first vertical plane including said longitudinal axis and normal to a second vertical plane including said longitudinal axis and the arc defining said arcuate bottom, to provide two half driving end portions; and means pivoting said driving end portions for scissoring movement towards and away from each other about an horizontal pivot axis lying in said first vertical plane and passing through the point of termination of said radius of curvature on said longitudinal axis in a direction normal to said second vertical plane, the opposite side walls of each of said half driving end portions diverging from each other in curved directions away from opposite sides of said first vertical plane respectively as projected on to a horizontal plane normal to both said first and second vertical planes, said opposite side walls in addition converging upwardly in curved directions towards each other from the lower edges of said arcuate bottom when viewed in said first vertical plane, said opposite sidewalls thereby defining non-planar surfaces.

2. The subject matter of claim 1 in which each of said non-planar surfaces is a concave cylindrical surface, the axis of said cylindrical surface forming a first acute angle with said longitudinal axis when projected onto said second vertical plane, the plane of said axis of said cylindrical surface and said longitudinal axis in turn lying at a second acute angle to said first vertical plane as viewed in said horizontal plane.

3. The subject matter of claim 2, in which the radius of curvature of said cylindrical surface is from four to eight times said given radius of curvature, said first acute angle is from eight to twelve degrees, and said second acute angle is from five to ten degrees.

4. The subject matter of claim 3, including a sleeve member longitudinally slidable over a portion of said split driver removing tool to hold said two half driving end portions in their closed together position.

References Cited in the file of this patent

UNITED STATES PATENTS

| 66,585 | Harvey | July 9, 1867 |
| 132,946 | Armstrong | Nov. 12, 1872 |
| 2,304,703 | O'Leary | Dec. 8, 1942 |

FOREIGN PATENTS

| 427,471 | France | Aug. 4, 1911 |